United States Patent [19]

Simon

[11] 3,968,823
[45] July 13, 1976

[54] LID FOR A CONTAINER AND A METHOD FOR SEALING THE LID ON A CONTAINER

[76] Inventor: B. Kenneth Simon, Chatham Park Apartments, Greentree, Pa. 15220

[22] Filed: Nov. 19, 1975

[21] Appl. No.: 633,241

[52] U.S. Cl. .............................. 150/.5; 215/232; 220/359; 53/39; 156/69
[51] Int. Cl.² ................. B65D 1/02; B65D 39/00; B65D 41/00
[58] Field of Search .............. 150/.5; 215/232, 233, 215/246; 220/359; 53/39; 156/69

[56] References Cited
UNITED STATES PATENTS

| | | | |
|---|---|---|---|
| 2,744,655 | 5/1956 | Vnuk | 156/69 X |
| 3,460,310 | 8/1969 | Adcock et al. | 53/39 |
| 3,548,140 | 12/1970 | O'Neill | 53/39 X |
| 3,767,076 | 10/1973 | Kennedy | 150/.5 X |
| 3,861,549 | 1/1975 | Watson et al. | 156/69 X |

Primary Examiner—George T. Hall
Attorney, Agent, or Firm—Buell, Blenko & Ziesenheim

[57] ABSTRACT

A continuous electrically conductive ring is applied to the top of a lid which is used for covering a container opening. The lid is then placed on the opening of the container and current is placed in the conductive ring. The current in the conductive ring causes heat which causes the lid material to fuse to the surface contacts of the container opening. The current is then removed and the material is allowed to cool creating a seal between the lid and the container.

6 Claims, 4 Drawing Figures

LID FOR A CONTAINER AND A METHOD FOR SEALING THE LID ON A CONTAINER

This invention relates to a lid for a container and a method for sealing the lid on a container.

THE PRIOR ART AND THE PROBLEM PRESENTED BY THE PRIOR ART

The problem presented is to create a seal between a lid and its corresponding container. The prior art is illustrated in FIGS. 1 and 2 which show a lid for a container and the material used in the lid to make a seal between the lid (or cap) and the container. The purpose of the seal is to prevent air and other contaminants from entering the product in the container. The seal also prevents leakage. FIG. 1 shows a cap 10. This cap is of a plastic material and is threaded to screw on to the mouth of a container (not shown). As shown in FIG. 1, the cap 10 is oriented with the top of the cap at the bottom of the figure. Near the top on the inside of the cap 10 is a sealing means 12 which is shown in an exploded form in an isometric view in FIG. 2. The sealing means comprises a disc of polyethylene film 14, an aluminum foil disc 16 and a disc of pulp board backing 18. The cap 10 is screwed on to a container not shown which can be made of some suitable plastic material or polyethylene material. When the cap 10 covers the container the polyethylene film 14 comes in contact with the wall at the opening of the container. An electrical current is placed in the aluminum foil 16 by known suitable induction techniques. The aluminum foil 16 acts as a resistor element, heats the polyethylene film and causes it to fuse to the top of the wall at the container opening. The induced current is then removed and the polyethylene film which has fused on the container walls at the opening is allowed to cool thereby creating an effective seal against air and contaminants. This type of seal is required in most food products.

There is nothing wrong with the seal. However, a problem of economics in material and labor is created. The aluminum foil 16 is costly and the fabrication of the general sealing means shown in FIG. 2 with the polyethylene film 14, aluminum foil 16 and the pulp board backing 18 is an expensive assemblage both from a standpoint of labor and material. The problem is further increased when large diameters are used. My improved lid avoids these problems and provides a more economical and facile sealing technique for a lid which is to be sealed to a container and particularly for a lid which has a substantial diameter.

A DETAILED DESCRIPTION OF THE DRAWINGS

THE INVENTOR'S SOLUTION TO THE PROBLEM

I provide a lid for a container having an opening comprising a lid having the same contour as the opening, the lid has a continuous ring of electrically conductive material on a top of the lid, the ring follows the contour of the mouth of the container.

I further provide that the ring of electrically conductive material has a width that approximately conforms to the walls of the container.

I preferably provide that the lid is made from a material which is capable of flowing under heat.

I also provide a method for sealing a lid on a container opening comprising applying a continuous ring of electrically conductive material on top of the lid and in the same general contour as the walls at the container opening; placing the lid on the container opening; placing an electrical current in the conductive ring allowing the lid to heat and fuse to the walls at the opening of the container; and removing the current from the conductive ring and allowing the lid and lid material which has fused onto the container opening wall to cool and thereby seal the lid to the container.

A DETAILED DESCRIPTION OF THE STRUCTURE OF THE LID AND THE METHOD FOR SEALING THE LID ON THE CONTAINER

Figure 1:
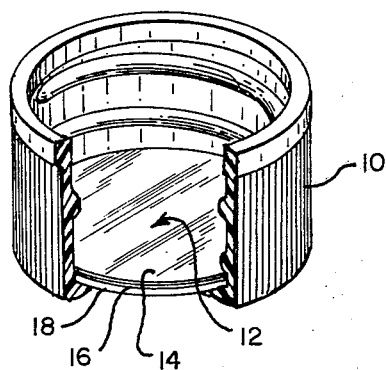
FIG. 1 is an isometric view of a closure with a portion broken away to show sealing means of the invention.
Figure 2:
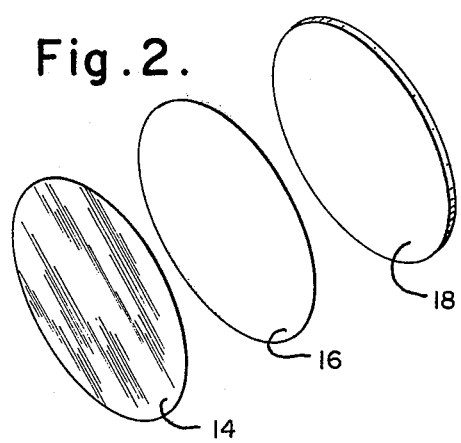
FIG. 2 is an exploded isometric view of the components that make up the sealing means used in FIG. 1.
Figure 3:
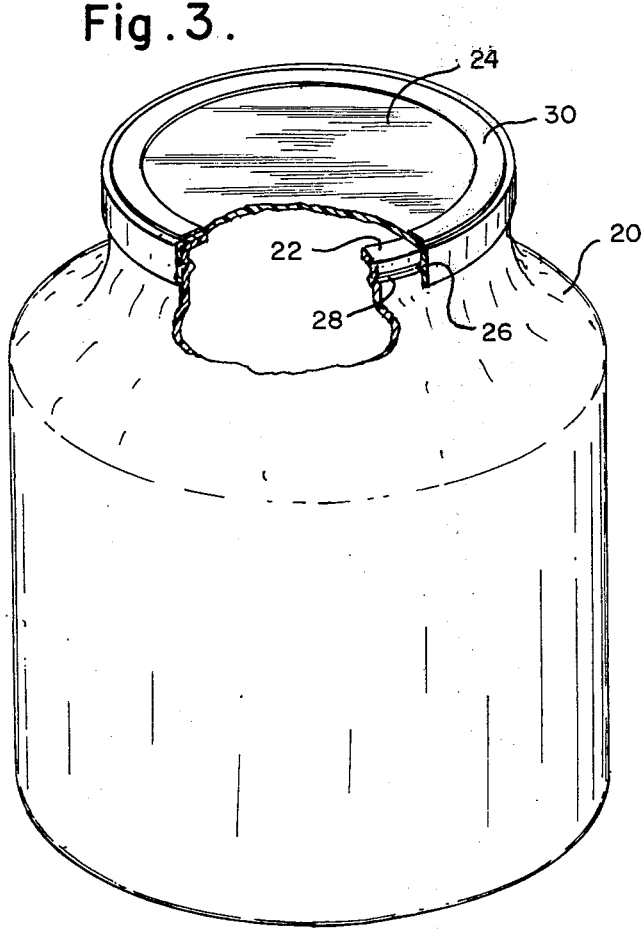
FIG. 3 is an isometric view of a large mouth container and closure with portion broken away showing new sealing means.
Figure 4:
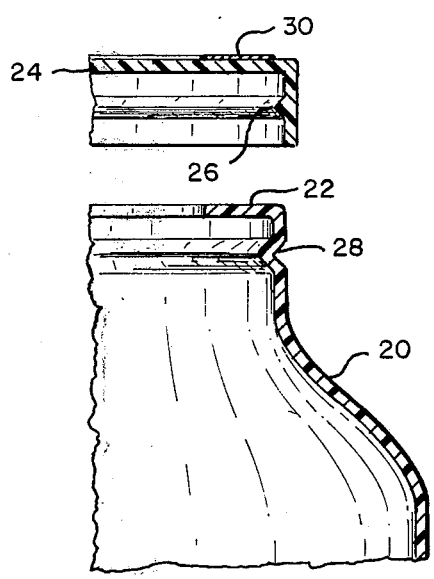
FIG. 4 shows a fragmentary sectional view of the closure and container.

Referring to FIGS. 3 and 4, a polyethylene container 20 is shown having a large opening or mouth with walls 22 at the opening. A lid 24 also made of polyethylene having a snap ring 26 is provided for insertion into detents 28 in the container 20 in the side of wall 22. A metallic electrically conductive material 30 in the shape of a ring is provided on the top of the lid 24. This conductive material is in the form of a continuous ring and follows the contour of the top of the wall 22 at the opening of the container 20. The top of wall 22 can also be referred to as a contact surface which contacts the underside of the lid 24 surface. Food or some other product is placed in the container 20. The lid 24 is snapped in place over the opening and abuts walls 22 (or contact surfaces) at the top of the container 20. An electrical current is induced by a suitable means known in the art and onto the electrically conductive continuous ring 30. This causes the metallic ring 30 which acts as a resistor to heat polyethylene lid 24 and causes a portion of the polyethylene between the lid 24 and the wall or contact surface 22 of the container 20 to flow and fuse together. The current is removed from the continuous electrically conductive ring 30 and the polyethylene is allowed to cool thereby creating an effective seal against air or other contaminants from entering the container.

It is to be understood that the invention is not limited to the use of a polyethylene material for the lid and the container and that any material which flows under heat would be suitable. It is also to be understood that in using the word ring in referring to the metallic conductor 30 that it can conform to any contour or configuration of the contact surface of the container 20. It is not limited to a circle but may include any other geometrical configuration. The width of ring 30 should be approximately the width of the contact surface of the top wall 22 of the container 20. The conductive material 30 can be of a metallic paste which can include any metal and the technique for placing the conductive continuous ring 30 on the lid can be done by an etched foil technique, paste or other suitable available techniques.

I claim:

1. A lid for a container having an opening comprising a lid having the same contour as the opening, the lid has a continuous ring of electrically conductive material on a top of the lid, the ring follows the contour of the mouth of the container.

2. A lid as recited in claim 1 wherein the ring of electrically conductive material has a width which approximately conforms to walls at the opening of the container.

3. A lid as recited in claim 2 wherein the lid is made from a material which is capable of fusing with the container under heat.

4. A lid as recited in claim 3 wherein the lid is made from a material which is identical to the container material.

5. A lid as recited in claim 4 wherein the lid is polyethylene.

6. A method for sealing a lid on a container opening comprising:
 a. applying a continuous ring of electrically conductive material on top of the lid and in the same general contour as the container opening;
 b. placing the lid on the container opening, the lid coming in contact with the top of the container wall;
 c. placing an electrical current in the conductive ring allowing the lid to heat and fuse to the top of the wall at the opening of the container; and
 d. removing the current from the conductive ring and allowing the lid and lid material which has fused onto the container opening wall to cool and thereby sealing the lid to the container.

* * * * *